Oct. 16, 1962  D. PIETROROIA  3,058,779
DUMP VEHICLE
Filed Jan. 16, 1961  4 Sheets-Sheet 1
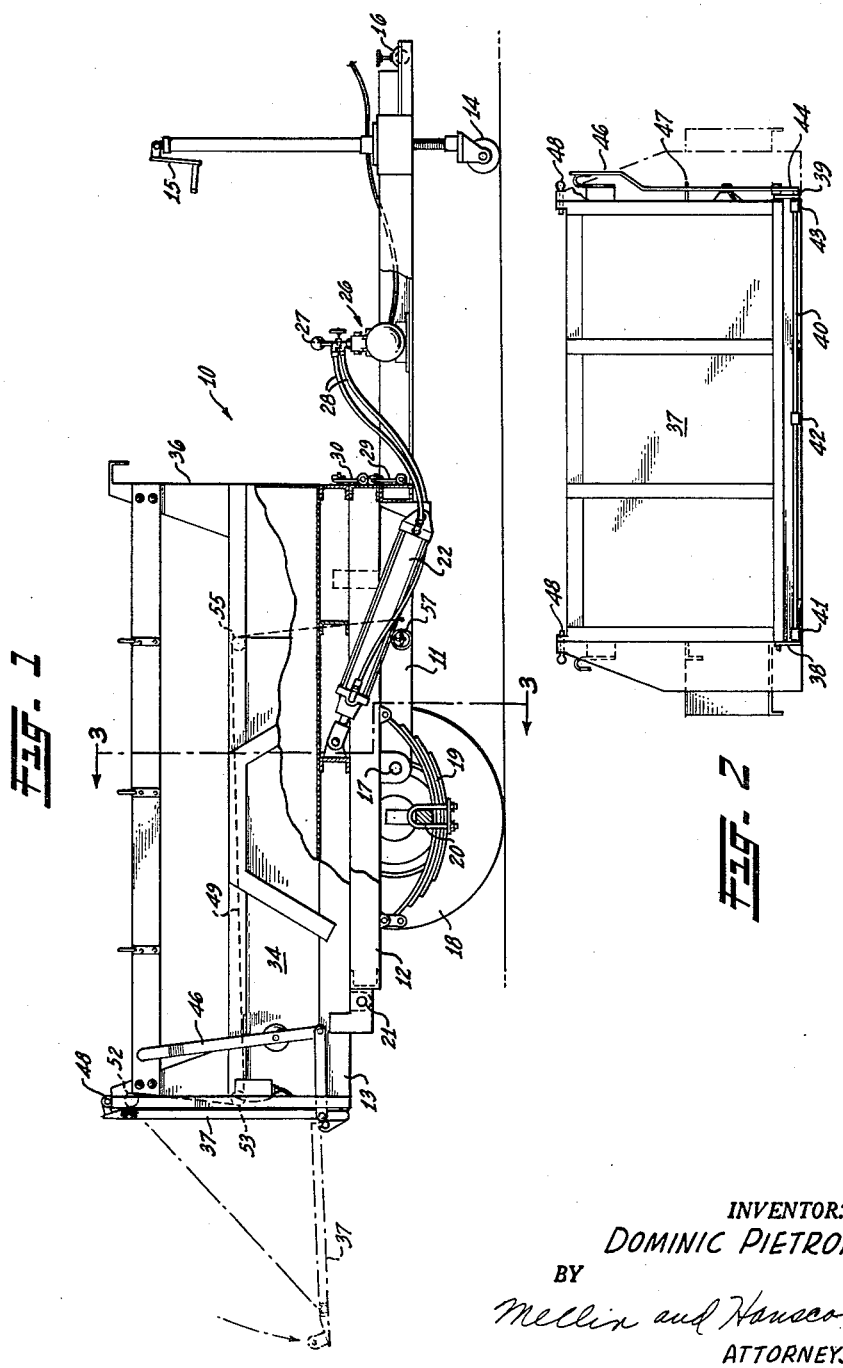
INVENTOR:-
DOMINIC PIETROROIA
BY
Mellin and Hanscom
ATTORNEYS Oct. 16, 1962  D. PIETROROIA  3,058,779
DUMP VEHICLE
Filed Jan. 16, 1961  4 Sheets-Sheet 2
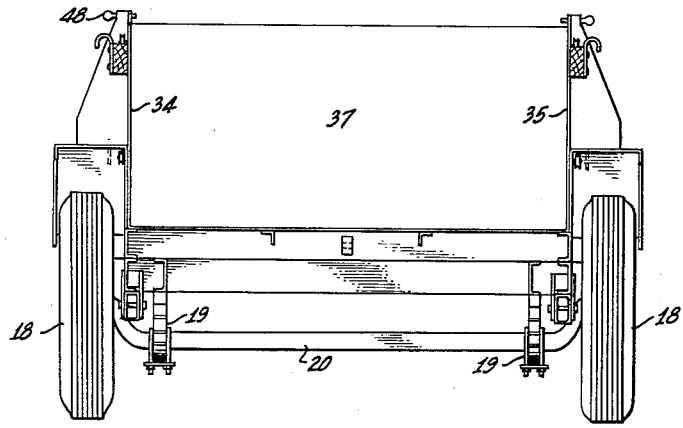
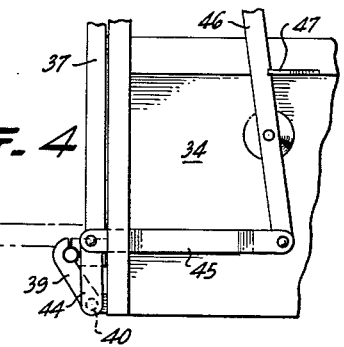
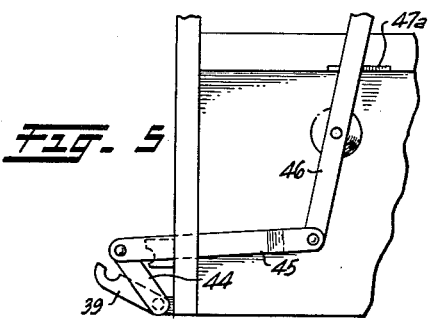
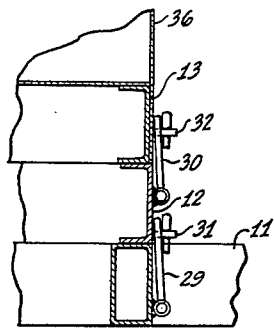
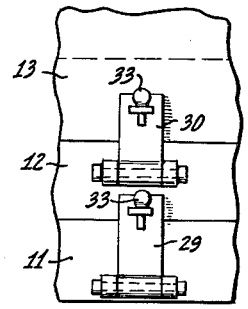
INVENTOR:—
DOMINIC PIETROROIA
BY
Neelin and Hanscom
ATTORNEYS

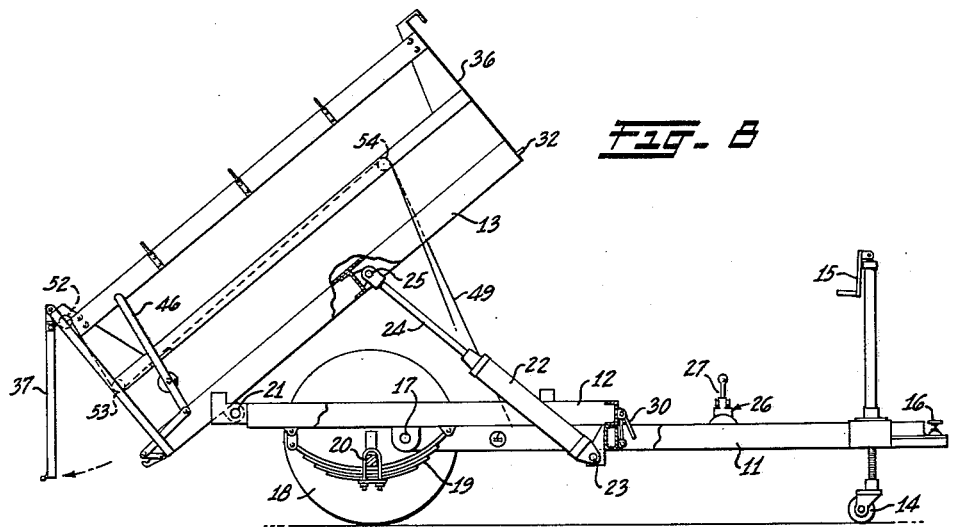
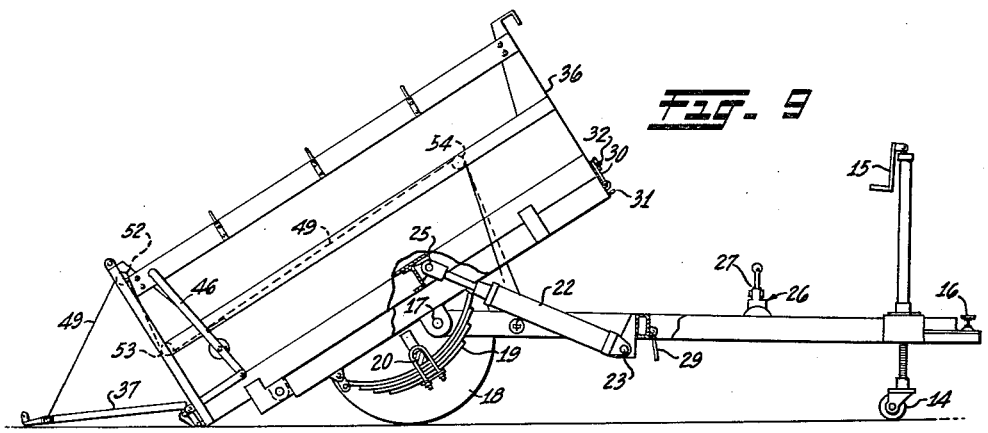

Oct. 16, 1962 D. PIETROROIA 3,058,779
DUMP VEHICLE
Filed Jan. 16, 1961 4 Sheets-Sheet 4

INVENTOR:—
DOMINIC PIETROROIA
BY
Mellin and Hansson
ATTORNEYS

United States Patent Office 3,058,779
Patented Oct. 16, 1962

3,058,779
DUMP VEHICLE
Dominic Pietroroia, 138 30th Ave., San Mateo, Calif.
Filed Jan. 16, 1961, Ser. No. 83,065
13 Claims. (Cl. 298—6)

This invention relates to dump vehicles and more particularly involves novel improvements therein which produce an enhancement of their utility for picking up loads as well as for dumping purposes.

In brief, a preferred embodiment of this invention comprises a dump vehicle having a main support frame, a bed frame and a bed with sides. The bed frame is disposed intermediate the support frame and bed and is pivotally supported and supporting of said support frame and bed, respectively. This general arrangement provides a wide range of positions into which the bed may be tilted with or independently of the bed frame. Moreover, where the pivot axes of the bed frame and bed are horizontally spaced, one being rearwardly of the other, the most rearward pivot axis may be utilized to keep the surface level of the bed relatively high during dumping, the forward pivot axis being used to lower the bed to approximate ground level during a pick-up operation. Although this general support arrangement has been previously used in dump vehicles, notably disclosed in United States Patent No. 2,718,431, issued to the inventor of the present application, this invention further provides and additionally teaches a structural arrangement for selectively pivoting the bed and the intermediate support frame upon their respective pivot axes with the aid of a single actuating mechanism. The present invention allows the bed of said vehicle to be tilted into proximate relation to the ground for pick-ups, while requiring a lesser tilting than normally employed for dumping, and although the bed is tiltable to a greater degree during dumping, the bed is then supported at a higher level than when tilting for a pick-up operation.

This invention also provides a mechanism for supporting a loaded tail gate in a horizontal plane as the bed of the vehicle is moved either into or from a tilted position. The mechanism comprises a means for rigidly interconnecting the tail gate and the main support frame when the gate is pivoted into a substantially horizontal plane. This connecting means causes the tail gate to be raised relative to the bed as said bed is tilted relative to the support frame. Thus, any load placed upon the tail gate will be supported upon a substantially horizontal surface as it is picked up or lowered, in the manner to be described.

One object of this invention is to provide a dump vehicle having a support frame, the improvement comprising a bed frame pivotally mounted from said support frame on a horizontal first axis, a bed pivotally mounted from said bed frame on a horizontal second axis, means for independently securing said bed to said bed frame and said bed frame to said support frame, and an actuating means interconnecting said support frame and said bed for pivoting said bed frame upon said first axis or said bed upon said second axis depending upon the attachment of said securing means.

Another object is to provide a dump vehicle having a support frame, the improvement comprising a bed pivotally mounted from said support frame on a horizontal axis, an actuating means interconnecting said support frame and said bed for tilting said bed upon said horizontal axis, a tail gate pivotally mounted from said bed on a base axis, and means for rigidly interconnecting said tail gate and said support frame when said gate is pivoted into a substantially horizontal plane, said connecting means being actuated by pivotal movement of said bed and causing said tail gate to be raised relative to said bed as said bed is tilted relative to said support frame.

Other objects of this invention will become apparent in view of the drawings and the following detailed description.

In the drawings forming a part of this application and in which like parts are identified by like reference numerals throughout the same, FIG. 1 is a side elevation of a preferred embodiment of the invention incorporaetd in a dump trailer, a portion of said trailer being broken away to illustrate certain operating structures and connections;

FIG. 2 is an end elevation of the tail gate assembly, a side portion of the vehicle frame having been removed to show gate-mounting structure;

FIG. 3 is a section taken on line 3—3 of FIG. 1;

FIG. 4 is a detail view of the mechanism for pivotally supporting the tail gate upon a base axis of the vehicle bed;

FIG. 5 is another detail view of the mechanism shown in FIG. 4 but illustrating said mechanism in a gate-releasing position;

FIG. 6 is an enlarged detail view in section of the latching means shown in FIG. 1 for securing the vehicle bed to a bed frame and the bed frame to the support frame;

FIG. 7 is a detail front elevation of the latching means shown in FIG. 6;

FIG. 8 is a side elevation of the trailer of FIG. 1 with the bed tilted upon the bed frame into a dump position;

FIG. 9 is another side elevation of the trailer of FIG. 1 with the bed tilted upon the support frame into a pick-up position;

Figure 10:
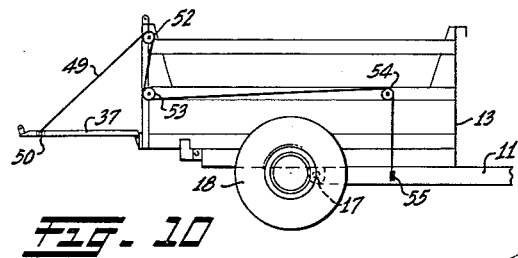
FIGS. 10 and 11 are simplified side elevations of the trailer, showing two positions of the bed and tail gate as said bed is tilted with a load upon said tail gate.

Referring to FIG. 1 there is shown a trailer type vehicle, generally indicated by number 10, and comprising a support frame 11, a bed frame 12 and a bed 13. The front end of frame 11 is provided with a retractable wheel 14 having manually operable actuating means 15, and a trailer hitch coupling 16.

Bed frame 12 is pivotally mounted to support frame 11 upon an axis 17 and is resiliently supported upon coaxially joined wheels 18 by leaf spring suspensions 19, said wheels being interconnected by an offset axle shaft 20. Bed 13 is pivotally mounted from the bed frame at the pivot juncture 21. It will be understood, of course, that the bed is normally supported upon the bed frame and that the forward end of the bed frame is supportable by the support frame 11.

An hydraulic actuating system is utilized for pivoting the bed frame 12 upon axis 17 or the bed upon axis 21. This system includes a double-acting cylinder 22 having a housing pivotally connected to the support frame 11 upon an axis 23 and having a movable piston rod 24 pivotally connected to the underside of bed 13 upon an axis 25. Cylinder 22 is operated by a conventional hydraulic power unit 26 having a directional control valve 27 and conduit lines 28. In a preferred form of power unit the speed of fluid movement through the valve is controlled and adjusted by a metering device.

A latching means is provided for independently securing the bed 13 to bed frame 12 and said bed frame to support frame 11. As more particularly shown in FIGS. 6 and 7, hinged plates 29 and 30 are pivotally connected to frames 11 and 12, respectively, each plate having a slot for receiving a tongue. Slotted tongues 31 and 32 are secured to frame 12 and bed 13, respectively, and fastening pins 33 are employed for securing each tongue to its mating plate member, as shown.

Bed 13 supports a pair of laterally spaced side walls 34 and 35, a front end wall 36 and a tail gate 37, said tail gate being pivotally mounted upon a base axis 37a of said bed by laterally spaced pairs of clamping jaws 38 and 39. One jaw of each pair is rigidly affixed to bed 13, the other jaw being attached to a rotatable shaft 40 mounted in bearings 41, 42 and 43. A crank arm 44, rigidly mounted to shaft 40, pivotally connects with a link 45 which in turn connects to a lever 46 pivotally mounted to side wall 34. A catch member 47 is rigidly mounted to side wall 34 and is engaged by lever 46 as said lever 46 is moved therepast. It will be understood, particularly in view of FIGS. 4 and 5, that a surface portion 47a tends to force lever 46 away from the side wall as said lever is moved from the position of FIG. 5 to the position of FIG. 4; and as lever 46 moves past member 47, it is engaged by its rear surface, thus preventing a reverse turning of the lever. In moving lever 46 from the position of FIG. 5 to FIG. 4, shaft 40 is rotated, causing jaws 38 and 39 to be mated and clamped upon hinge pins of the tail gate. The tail gate may be released from its base axis pivot mounting by merely reversing the operation of lever 46, springing the lever outward from catch member 47 and moving it to the position of FIG. 5.

Tail gate 37 may also be supported pendantly from an upper pivot axis by a pair of pins 48. These pins support the tail gate when the base axis support is released, as when dumping a load.

In operation, the above described trailer apparatus may be selectively pivoted upon either axis 17 or axis 21, depending upon the latching arrangement of hinged plates 29 and 30. When the trailer is used for dumping a load of aggregate material, hinge plate 30 is released from tongue 32, and the tail gate is released from its base hinge by operation of lever 46 into the position of FIG. 5. Since pivot axis 21 is more rearwardly than axis 17, the level of bed 13 is retained relatively high, allowing the bed to be tilted into a steep incline.

If the trailer is to be used for picking up a load, hinge plate 30 is secured to tongue 32 and hinge plate 29 is released from tongue 31. Tail gate 37 is then pivotally supported upon its base hinge, the pendant support pins 48 having been removed. When the hydraulic cylinder 22 is then actuated, the bed, together with bed frame 12, may be pivoted into a position such as shown in FIG. 9. In this position the bed of the trailer is proximate ground level and the tail gate 37 is substantially horizontal. A chain or some other connecting means may then be utilized, interconnecting the tail gate and bed, for raising the load as the cylinder 22 is reversely operated and bed 13 moved from a tilted position to a horizontal position.

As indicated above, this invention also provides a novel means for continuously supporting a loaded tail gate in a horizontal position as the bed 13 is moved between horizontal and titlted positions. Referring to the simplified illustrations of trailer 10, FIGS. 10 and 11, a continuous cable 49 rigidly interconnects tail gate 37 and support frame 11. Cable 49 is releasably anchored to both sides of the tail gate by a bracket 50 and cotter pin 51, and is symmetrically drawn around pulleys 52, 53 and 54 on each side.

Figure 12:
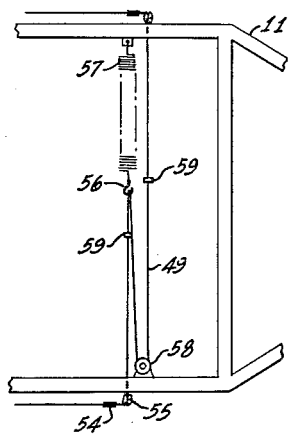
FIGS. 12 and 13 are detail plan views of the cable connections and resilient biasing means mounted to the support frame of the vehicle.
Figure 13:
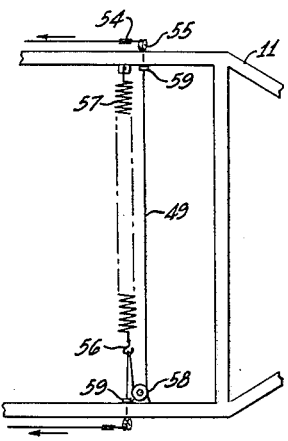
Figure 14:
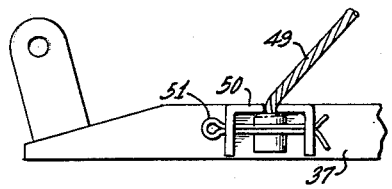
FIG. 14 is a detail view of the connection for joining the cable to the tail gate.

Cable 49 also extends through openings in support frame 11, being entrained around roller guides 55 and engaged by the hooked end 56 of helical spring 57, as shown in FIGS. 12 and 13. A pulley 58 is attached to one side of frame 11, and the cable is entrained therearound, allowing the single spring member 57 to provide tension to both ends of the cable. Stop members 59 are clamped to the cable to limit the extension of said cable from frame 11, as shown in FIG. 13.

It is to be realized that the cable connections above described provide means for causing the tail gate 37 to be raised relative to bed 13 as said bed is tilted (together with frame 12) relative to support frame 11. Moreover, pulley members 52 and 54 are selectively located with respect to gate axis 37a and pivot axis 17, respectively, so that tail gate 37 may be continuously supported in the horizontal as the bed 13 is raised.

Figure 11:
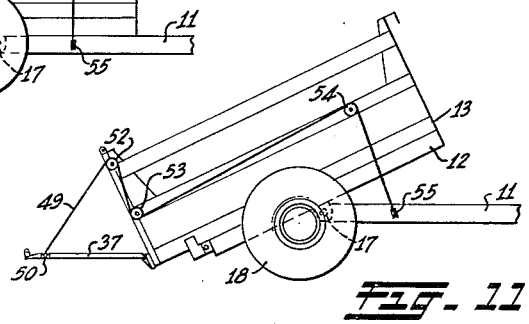

The manner of operation will be apparent from a study of the drawings, particularly in view of the following description:

If bed 13 is in a horizontal position, as in FIG. 10, then tail gate 37 may be manually moved from a closed, vertical position into the horizontal position shown. It will be understood that as the tail gate is moved into its horizontal position, spring 57 becomes increasingly tensioned until stop members 59 engage the sides of frame 11. The weight of tail gate 37 may be used to counterbalance the tension in spring 57. Thus, the tail gate need not be held in its horizontal position, although the capacity or resiliency of spring 57 should be sufficient to overcome the mechanical friction of the pulley members.

Obviously, tail gate 37 cannot drop below the horizontal, since stop members 59 prevent the further extension of cable 49, but if the tail gate were manually raised against the end of bed 13, spring 57 will take the slack out of both ends of the cable as indicated by FIG. 12.

Assuming again that bed 13 is in a horizontal position and that tail gate 37 has been lowered, it will be seen tnat as the bed is tilted upon pivot axis 17 (FIG. 11) the tail gate will continue to be supported in the horizontal, for increasing the distance between pulleys 54 and 55 will produce a shortening of the cable length between pulley 52 and bracket 50. It will be understood, of course, that not all arrangements of pulley members 54 and 52 will maintain the tail gate in a horizontal position as the bed is pivoted. However, an indefinite number of workable pulley arrangements can be devised by experimentation which will maintain the trail gate in a substantially horizontal position.

It is to be realized that the particular embodiment shown and described is to be taken as a preferred embodiment of the same, and that various changes in the shape, size and arrangement of parts may be resorted to without departing from the spirit of the invention or the scope of the attached claims.

Having thus described my invention, what I claim and desire to secure by Letters Patent is:

1. In a dump vehicle having a support frame, the improvement comprising load carrying means including a bed pivotally supported on a pivot on said support frame, an actuating means interconnecting said support frame and said bed for tilting said bed upon said pivot, a tail gate pivotally mounted on said bed, and means connecting said tail gate and said support frame for supporting said gate when pivoted into a substantially horizontal plane, said connecting means being actuated by pivotal movement of said bed and causing said tail gate to pivot relative to said bed as said bed is tilted relative to said support frame.

2. The apparatus of claim 1 including a resilient biasing means for taking up slack in said connecting means when said tail gate is pivotally moved from a horizontal position toward a fully raised position.

3. The apparatus of claim 1 including means for releasably and pendantly mounting said tail gate from said bed on an upper pivot, and wherein said tail gate is mounted on said bed by a releasable pivot connection, allowing said tail gate to be pendantly supported from said upper pivot.

4. In a dump vehicle having a support frame, the improvement comprising load carrying means including a bed pivotally supported on a pivot on said support frame, an actuating means interconnecting said support frame and said bed for tilting said bed upon said pivot, a tail gate pivotally mounted on said bed, a flexible cable connecting said tail gate and said support frame, and means mounted on said bed and engaged by said cable for supporting said tail gate in a horizontal position and causing said tail gate to pivot relative to said bed as said bed is tilted relative to said support frame, whereby said tail gate is continuously supported in a substantially horizontal plane as said bed is pivoted by said actuating means.

5. The apparatus of claim 4 including a resilient biasing means for taking up slack in said cable when said tail gate is pivoted from a horizontal position toward a fully raised position.

6. In a dump vehicle having a support frame, the improvement comprising load carrying means including a bed pivotally supported on a pivot on said support frame, an actuating means interconnecting said support frame and said bed for tilting said bed upon said pivot, a tail gate pivotally mounted on said bed on a base pivot, a flexible cable interconnecting said tail gate and said support frame, said cable being trained around pulley members mounted on said bed at fixed distances from said pivot and said tail gate base pivot, said cable also being trained around a pulley member mounted upon said support frame and engaged by a biasing means, said biasing means causing said cable to be retracted when said tail gate is pivoted from a horizontal position toward a fully raised position.

7. The apparatus of claim 6 including a stop member attached to said cable and engageable with said support frame as said tail gate is pivoted into a horizontal position.

8. In a dump vehicle having a support frame, the improvement comprising load carrying means including a bed pivotally supported on a pivot on said support frame, an actuating means interconnecting said support frame and said bed for tilting said bed upon said pivot, a tail gate pivotally mounted on said bed on a base pivot, a flexible cable connected at both ends to opposite sides of said tail gate and being trained around pulleys mounted upon said bed and said frame, certain of said pulleys being mounted on said bed at fixed distances from said pivot and said tail gate base pivot, a helical spring connected at one end to said support frame and having its other end engaged with said cable, and stop members attached to said cable and engageable with said support frame as said cable is urged against said spring and said tail gate is pivoted into a horizontal position.

9. In a dump vehicle having a support frame, the improvement comprising a bed frame pivotally mounted from said support frame on a horizontal first axis, a bed pivotally mounted from said bed frame on a horizontal second axis, an actuating means connecting said support frame and said bed for pivoting said bed frame upon said first axis or said bed upon said second axis, and means for independently securing said bed to said bed frame and said bed frame to said support frame, said securing means comprising a first releasable latch for securing said bed to said bed frame and a second releasable latch for securing said bed frame to said support frame.

10. In a dump vehicle having a support frame, the improvement comprising a bed frame pivotally mounted from said support frame on a horizontal first axis, a bed pivotally mounted from said bed frame on a horizontal second axis, a tail gate, means for releasably and pivotally mounting said tail gate from said bed on a base axis, means for releasably and pendantly mounting said tail gate from said bed on an upper axis, means interconnecting said tail gate and said bed for supporting said gate when mounted on said base axis and pivoted into a horizontal plane, means for independently securing said bed to said bed frame and said bed frame to said support frame, and an actuating means interconnecting said support frame and said bed for pivoting said bed frame upon said first axis or said bed upon said second axis depending upon the attachment of said securing means.

11. In a dump vehicle having a support frame, the improvement comprising a bed frame pivotally mounted from said support frame on a horizontal first axis, a bed pivotally mounted from said bed frame on a horizontal second axis, a tail gate, means for releasably and pivotally mounting said tail gate from said bed on a base axis, means for releasably and pendantly mounting said tail gate from said bed on an upper axis, means connecting said tail gate and said support frame when said gate is pivoted into a substantially horizontal plane, said connecting means being actuated by pivotal movement of said bed and causing said tail gate to be raised relative to said bed as said bed is tilted relative to said support frame, means for independently securing said bed to said bed frame and said bed frame to said support frame, and an actuating means interconnecting said support frame and said bed for pivoting said bed frame upon said first axis or said bed upon said second axis depending upon the attachment of said securing means.

12. The apparatus of claim 11 including a resilient biasing means for taking up slack in said connecting means when said tail gate is pivoted from a horizontal position toward a fully raised position.

13. In a dump vehicle having a support frame, the improvement comprising a bed frame pivotally mounted from said support frame on a horizontal first axis, a bed pivotally mounted from said bed frame on a horizontal second axis, a tail gate, means for releasably and pivotally mounting said tail gate from said bed on a base axis, means for releasably and pendantly mounting said tail gate from said bed on an upper axis, a flexible cable interconnecting said tail gate and said support frames, said cable being trained around pulley members mounted from said bed at fixed distances from said horizontal first axis and said tail gate base axis, said cable also being trained around a pulley member mounted upon said support frame and engaged by a biasing means, said biasing means causing said cable to be retracted when said tail gate is pivoted from a horizontal position toward a fully raised position, means for independently securing said bed to said bed frame and said bed frame to said support frame, and an actuating means interconnecting said support frame and said bed for pivoting said bed frame upon said first axis or said bed upon said second axis depending upon the attachment of said securing means.

References Cited in the file of this patent
UNITED STATES PATENTS

| | | |
|---|---|---|
| 2,213,385 | Dailey | Sept. 3, 1940 |
| 2,491,417 | Pflantz et al. | Dec. 13, 1949 |
| 2,718,431 | Pietroroia | Sept. 20, 1955 |